United States Patent
Ijtsma et al.

(10) Patent No.: US 7,151,725 B2
(45) Date of Patent: Dec. 19, 2006

(54) METHOD OF IMMEDIATELY WRITING OR READING FILES ON A DISC-LIKE RECORDING MEDIUM HAVING CONTROL INFORMATION ON DEFECT MANAGEMENT STORED IN A PREDEFINED LOCATION

(75) Inventors: Pope Ijtsma, Eindhoven (NL); Dirk Hamelinck, Hasselt (BE)

(73) Assignee: Koninklijke Philips Electronics N. V., Eindhoven (NL)

( * ) Notice: Subject to any disclaimer, the term of this patent is extended or adjusted under 35 U.S.C. 154(b) by 335 days.

(21) Appl. No.: 10/792,626

(22) Filed: Mar. 3, 2004

(65) Prior Publication Data

US 2004/0170096 A1    Sep. 2, 2004

Related U.S. Application Data

(63) Continuation of application No. 10/453,017, filed on Jun. 3, 2003, now Pat. No. 6,724,701, which is a continuation of application No. 09/873,565, filed on Jun. 4, 2001, now Pat. No. 6,594,209.

(30) Foreign Application Priority Data

Jun. 6, 2000    (EP) ................... 00201988

(51) Int. Cl.
*G11B 15/52*    (2006.01)
(52) U.S. Cl. ................... 369/47.14; 369/53.15
(58) Field of Classification Search ................... None
See application file for complete search history.

(56) References Cited

U.S. PATENT DOCUMENTS

| | | | |
|---|---|---|---|
| 5,602,815 A * | 2/1997 | Klappert et al. | 369/59.25 |
| 6,578,049 B1 * | 6/2003 | Adolph et al. | 707/104.1 |
| 6,606,285 B1 | 8/2003 | Ijtsma et al. | |
| 6,760,288 B1 | 7/2004 | Ijtsma et al. | |
| 6,941,061 B1 * | 9/2005 | Ando et al. | 386/95 |

* cited by examiner

*Primary Examiner*—Paul Huber

(57) ABSTRACT

A method of recording digital information signals on a removable rewritable disc like recording medium, the method including recording user data on a logical area of the disc and, prior to removal of the disc out of a recording/reproducing apparatus, finalizing the disc with a lead-in and lead-out area comprising predefined medium format data. A general purpose area within the logical area for other use than recording of user data, is being reserved. Such a use may be, for example, defect management. Further, the method involves interrupting recording a lead-in area or a lead-out area at predefined splice points whenever a request for user data is made.

6 Claims, 9 Drawing Sheets

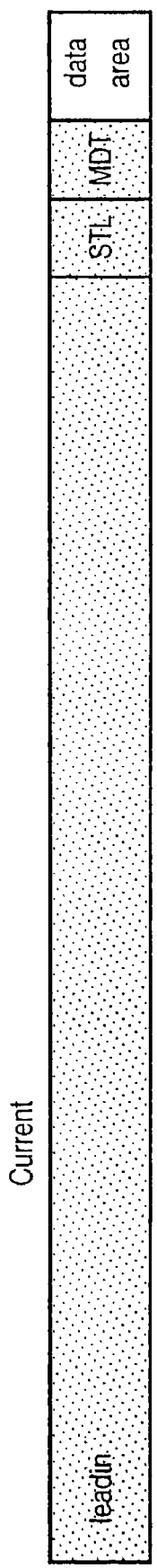
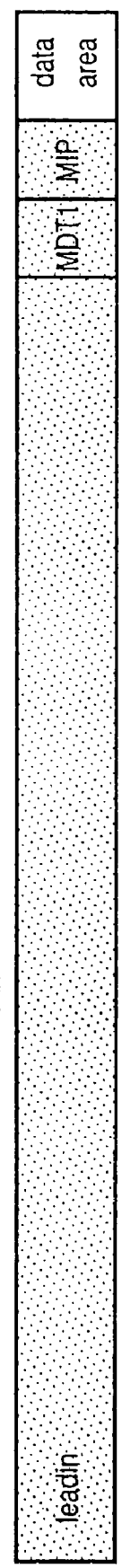
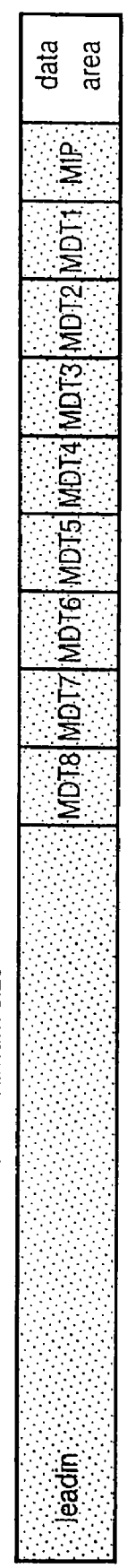
FIG. 2A
FIG. 2B
FIG. 2C

| Status 1 Bit 5,4 | Original LBA | Replacement LBA | |
|---|---|---|---|
| Marked | 01 0010 | 00 1010 | Ordering on the LBA of the original sector |
| Replaced | 00 0011 | 00 1011 | |
| Replaced | 00 0020 | 00 1120 | |
| Marked | 01 0021 | 00 1121 | |
| Replaced | 00 0100 | 00 1101 | |
| Available | 10 0000 | 10 0013 | Ordering on LBA replac. address |
| Available | 10 0000 | 10 0014 | |
| Unavailable | 11 xxxx | 11 0008 | Ordering on LBA of the replacement address |
| Unavailable | 11 xxxx | 11 0009 | |
| Unavailable | 11 xxxx | 11 0100 | |

FIG. 4

| Contents | Length in bytes |
|---|---|
| Signature 'MDT' 'SDT' 'TDT' | 3 bytes |
| MDT order number (1....8) | 1 byte |
| MDT update count (same for all 2K in the packet, used to check MDTx = SDTx | 4 bytes |
| Minimum LBA in this sector | 3 bytes |
| Maximum LBA in this sector | 3 bytes |
| Start of addresses with 00 (used replacements) | 2 bytes |
| Start of addresses with 01 (marked replacements) | 2 bytes |
| Start of addresses with 10 (usable replacements) | 2 bytes |
| Start of addresses with 11 (unusable replacements) | 2 bytes |
| Reserved | 4 bytes |
| 337 DT entries (6 bytes per entries, same as V0.5 version) | 2022 |
| .... | |

FIG. 5

| Contents | Length in bytes |
|---|---|
| Version info: Minimum drive read version (e.g. 01 50 = V1.5) | 2 bytes |
| Version info: Minimum drive write version | 2 bytes |
| Version info: Minimum System read version (OS or Application) | 2 bytes |
| Version info: Minimum System write version | 2 bytes |
| Start of General Purpose Area | 3 bytes |
| Size of Defect Management Area | 3 bytes |
| Size of General Purpose Area | 3 bytes |
| Progress Tracking Pointer (PTP) | 3 bytes |
| Number MDT packets in used (1....8) | 1 byte |
| MDT1 location | 3 bytes |
| MDT2 location | 3 bytes |
| .... | 15 bytes |
| MDT8 location | 3 bytes |
| SDT1 location | 3 bytes |
| .... | 18 bytes |
| SDT8 location | 3 bytes |
| Update counter (used to detect mismatch between MIP and SIP) | 4 bytes |

METHOD OF IMMEDIATELY WRITING OR READING FILES ON A DISC-LIKE RECORDING MEDIUM HAVING CONTROL INFORMATION ON DEFECT MANAGEMENT STORED IN A PREDEFINED LOCATION

This application is a continuation of U.S. application Ser. No. 10/453,017, filed Jun. 3, 2003, now U.S. Pat. No. 6,724,701, which is a continuation of U.S. application Ser. No. 09/873,565, filed Jun. 4, 2001, now U.S. Pat. No. 6,594,209.

BACKGROUND OF THE INVENTION

1. Field of the Invention

The invention relates to a method of recording digital information signals on a removable rewritable disc like recording medium, the method comprising submitting fixed sized packets of user information for recording on the disc, the packets having a minimum packet size, allocating said packets to continuous sectors on the disc in a data area, said sectors having a minimum addressable sector size smaller than the minimum packet size, wherein said allocating comprises reallocating defect areas to a spare area on the disc, and recording said packets on the disc along a spiral track.

The invention further relates to an apparatus for recording/reproducing digital information signals on/from a removable rewritable disc like recording medium, the apparatus comprising input means for receiving signals representing fixed sized packets of user information for recording on the disc, the packets having a minimum packet size, allocating means for allocating said packets to continuous sectors on the disc in a data area, said sectors having a minimum addressable sector size smaller than the minimum packet size, defect management means for reallocating defect areas to a spare area on the disc, and recording means for recording the signals representing user data along a spiral track on the disc.

2. Description of the Related Art

The PC world needs a replacement for the floppy drive. A rewritable storage medium of the disc-like optical type, such as the CD-RW, seems to be a logical choice because the read function of the magnetic floppy is already replaced by the CD-ROM. All PC's today are equipped with a CD-ROM and applications and software are distributed on CD-ROM. Therefore, a recording medium like CD-RW or rewritable DVD, seems to be the perfect media to fill in the needed write capability. MO and ZIP/Jazz already tried to fill this gap, but they all miss compatibility with the installed base. That is exactly what CD-RW, for instance, can deliver with the installed base of over approximately 200 million CD-ROM drives (MR1.0 compatible). RW media are cheap and the capacity is sufficient for floppy use.

Furthermore, manufacturers of operating systems want to get rid of legacy material like the floppy drive. For OEM companies, the idea is attractive, as they can replace the floppy drive, the CD-ROM and the DVD-ROM drive by a one spindle drive, like a Combi, and by a double writer in the future. It will also add a new feature to the drive other than the ever increasing speed.

There are products on the market (like DirectCD) which enable using a CD-RW like a floppy drive, but they don't behave the way one would expect a CD floppy drive to behave. The access time is too low, formatting time is too long and, more important, the drive does not fit into the strategy of current OS. The disc should be immediately available for dragging and dropping of files. A fast eject is required, deleting should be instant. Due to enable multiple drag and drop, a defect management is required. However, the defect management should be done by the drive. This opens the way to use UDF 1.02 instead of UDF1.5, which will not be supported on the write side by Microsoft. Further background formatting must be done by the drive and not by the application or OS to minimize bus traffic, and interaction between the drive and the OS. Finally, Read/Modify/Write for packets should be done by the drive.

Such a method and apparatus is disclosed in European Patent Application No. EP 99203111.2, corresponding to U.S. Pat. Nos. 6,606,285 and 6,760,288, and European Patent Application No. EP 00200290.5, both incorporated by reference.

However, the method of defect management disclosed is limited to one-packet based replacements, the size of the replacement packets being the same as the size of the write-packet. For instance, in case of CD-RW, both sizes are 64 kB or 32 sectors. Although this is sufficient to cover Disk-Over-Write (DOW) problems of RW media, it appears to be inefficient with respect to robustness for local physical defects, like finger prints, scratches and media weak-spots. DOW tends to wear out sectors equally within one written packets. Thus, it makes a lot of sense to replace the whole unity in one step, since the indication that a part (2 kB-sector) of the packet is wearing out can be interpreted as a wear-out warning for the whole packet. But due to the spiral-groove structure of an optical record carrier, non-DOW defects, like the ones mentioned above, will typically appear on neighborhood tracks. For example, a scratch of 3.5 cm from inner to outer diameter across the disk affects approximately 3.5 cm/1.5 µm=23300 tracks, in case of an CD-RW disk. This implies approximately 21000*64 kByte=1344 Mbyte. With a 74 min CD-RW disc with 500 Mbyte user area and approximately 40 Mb spare area, this is clearly not feasible.

SUMMARY OF THE INVENTION

In consequence, among other things, it is an object of the invention to obviate above-mentioned disadvantages. Accordingly, a method as described in the opening paragraph, is characterized in that the method further comprises the step of reallocating defect areas by a replacement area in a spare area, the size of the replacement area being substantially smaller than the minimum packet size. Correspondingly, an apparatus as described in the opening paragraph is characterized in that the defect management means are adapted to reallocate defect areas by a replacement area in the spare area, the size of the replacement area being substantially smaller than the minimum packet size.

Local physical defects, not effecting a whole packet, will then require less spare area than if a whole packet would be replaced.

BRIEF DESCRIPTION OF THE DRAWINGS

These and further aspects and advantages of the invention will be discussed in more detail hereinafter with reference to the disclosure of preferred embodiments, and in particular with reference to the appended Figures, in which:

FIGS. 2A–2C show the lay-out of a Main Defect Table (MDT) according to the invention;

FIG. 4 shows the Main Defect Table (MDT) packet organization according to the invention, showing the entries;

FIG. 5 shows the Main Defect Table (MDT) layout;

FIG. 7 shows the content of the Main Info Packet (MIP)/Second Info Packet (SIP);

FIGS. 8A–8C show the changes with respect the Secondary Defect Table (SDT) and the Temporary Defect Table (TDT)

DESCRIPTION OF THE PREFERRED EMBODIMENTS

Figure 1:
FIG. 1 shows a basic disc lay-out of a CD-ROM.

FIG. 1 illustrates, schematically, the basic format of a CD-ROM, as known from the relevant standard, which is often denoted to as the 'Yellow book', in analogy to the 'Red book' standard for the audio CD. Descriptions of the physical standard of the CD-ROM can be found in the public available documents ISO/IEC 10149, of the audio-CD in IEC 908. The physical standard for the recordable CD, denoted as the 'Orange book', is disclosed in ISO/IEC 11172/1/2/3/. The standard for the logical format of the CD-ROM is described in ISO-9660 (the High Sierra standard) and for the recordable CD in ECMA 168/IS013940 (the Frankfurter proposal).

The data carrying area of the CD-ROM starts with a LEAD-IN area, a DATA AREA is available for user data and ends with a LEAD-OUT area.

The methods for Defect Management and Formatting are described in the aforementioned European Patent Application Nos. EP 99203111.2 and EP 00200290.5, both incorporated by reference.

The defect sparing possibility of the method disclosed in the above-mentioned applications, is limited to one packet-based replacements. In case of CD-RW, the packet size being 64 kB (32 sectors), equal to the packet write block size. In case of Disk-Over-Write (DOW) problems of RW media, this choice is sufficient. DOW tends to wear out packets equally within one written packet. Thus, it is practical to replace the whole unit in one step, since the indication that a part (for instance, a 2 kB sector) of the packet is wearing out, can be interpreted as a wear-out of the whole packet.

However, due to the spiral-groove structure of a CD, non-DOW defects, such as fingerprints, scratches and local media defects, will typically appear as short defects re-occurring on neighboring tracks. This means that within one spiral of a track, defects typically are located within the borders of one sector, locally preceded and followed by multiple sectors without defects. For example, for CD-RW with a 64 kB packet comprises approximately 5 tracks at the inner circle and approximately 2 tracks at the outer circle, typically only between 2 and 5 replacements of 2 kB packets are needed for a packet affected by the defect. The surrounding data-sectors of the same packet need not to be replaced.

By choosing the size of a replacement area substantially lower than the packet write size, more defect replacements can be handled. For instance, in case of CD-RW, a radial scratch of 3.5 cm from the inner to the outer diameter across the disk, will claim approximately 40 Mb of sparing area, in case of a 2 kB packet replacement. The amount of crossings of an 80 minute disc being: 3.5 cm/1.5 µm=23300 minus scratches in link blocks (−20%) plus scratches affecting 2 sectors on the border (+10%)=21000. Thus requiring 21000 pointers, leading to a Defect Area size of 21000*2 kB=42 Mb. Available on a 74 min disc with a user area >500 Mb the amount of 48 Mb. In case of 64 kB replacements, a scratch of 1 mm will be sufficient to fully claim the same 40 MB sparing area.

The choice for 2 kB sparing has the following consequences for drives. The defect table size needs to be relatively larger as each 2 kB replacement space is a potential pointer in the table, when accounting for the same amount of replacement area. As an extreme example, in the case of DOW wear-out of a packet, the defect table will contain 32 entry-positions instead of 1 kB in case of a 64 kB replacement system.

To solve this problem, the Main Defect Table (MDT) is allowed to grow from 1 packet to 8 packets maximal. This is illustrated in FIGS. 2A–2C, showing, in FIG. 2A, the MDT layout with a fixed size according to the method of defect management disclosed in the above-mentioned applications. FIG. 2B and FIG. 2C show the MDT layout according to the invention with a variable size, i.e., with a minimum size and a maximum size, respectively. Next, consecutive MDT packets are added in the Lead-In in a direction pointing to the inner diameter.

The disc starts with only one MDT packet (MDT1). Each packet is identified with an order number (1 . . . 8) as will be shown with reference to FIG. 5

Further a Main Info Packet (MIP) replaces the Sentinel Packet (STL) as disclosed in the above-mentioned applications, which will be explained with reference to FIGS. 6A–6B.

Figure 3:
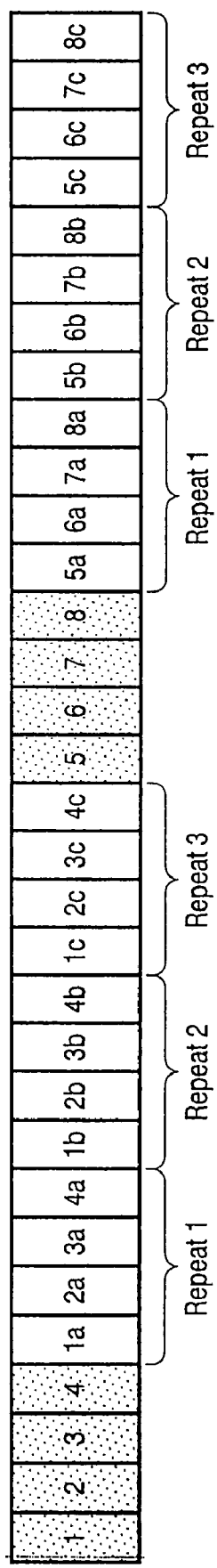
FIG. 3 shows the Main Defect Table (MDT) packet organization according to the invention, showing repeated sectors.

FIG. 3 shows the Main Defect Table (MDT) packet organization according to the invention, showing repeated sectors. Within each MDT packet, 4 sectors are repeated 3 times in the depicted geographical order. This has the advantage of protecting against fingerprints. It is noted that a repeat factor of, for instance, 3 could also be chosen, being a matter of implementation.

All addressing is 2 kB based Logical Block Addressing (LBA). A complete replaced packet has 32 entries in the table. As an example, a packet may contain 8*337=2696 pointers per packet, equivalent to a defect area of 5.26 MB, handling a scratch of ½ cm.

FIG. 4 shows the Main Defect Table (MDT) packet organization according to the invention, showing the entries. The entries are ordered per 2 kB sector. Bit 4 and 5 indicate the status: replaced ('00') and marked ('01'). These are ordered on ascending LBA and mixed in one block. This appears to be easier for the firmware. Other entries with value ('10') for bits 4 and 5, indicate available entries, which are ordered on replacement LBA. Finally unavailable entries are marked with ('11'). Preferably, drives should keep available replacements ('10') available on sector base, which allows firmware to insert new defects easily.

FIG. 5 shows 5 the Main Defect Table (MDT) layout according to its content.

Figure 6A:
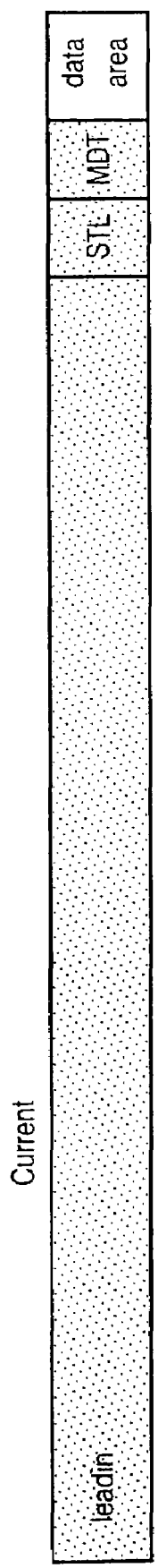
FIGS. 6A–6B show the composition of a Main Info Packet (MIP)
Figure 6B:
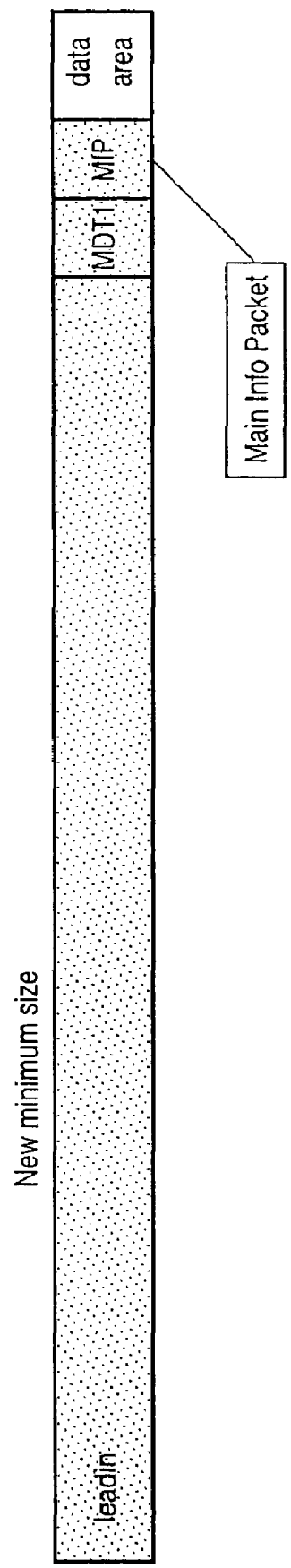

FIGS. 6A–6B show the composition of a Main Info Packet (MIP), replacing the function of the Sentinel Packet (STL) of the method described in the above-mentioned applications. As the Main Defect Table (MDT) can significantly grow into the Lead-In Areas, long detection times with a Sentinel Packet (STL) may occur. The Main Info Packet (MIP) contains Main Defect Table (MDT) and Secondary Defect Table (SDT) packet positions. The Main Info Packet (MIP) further contains version info. The Main Info Packet (MIP) is repeated 32 times and is located on a fixed position (last packet Lead-In Area) and cannot be moved or spared.

Figures 8A, 8B, 8C:
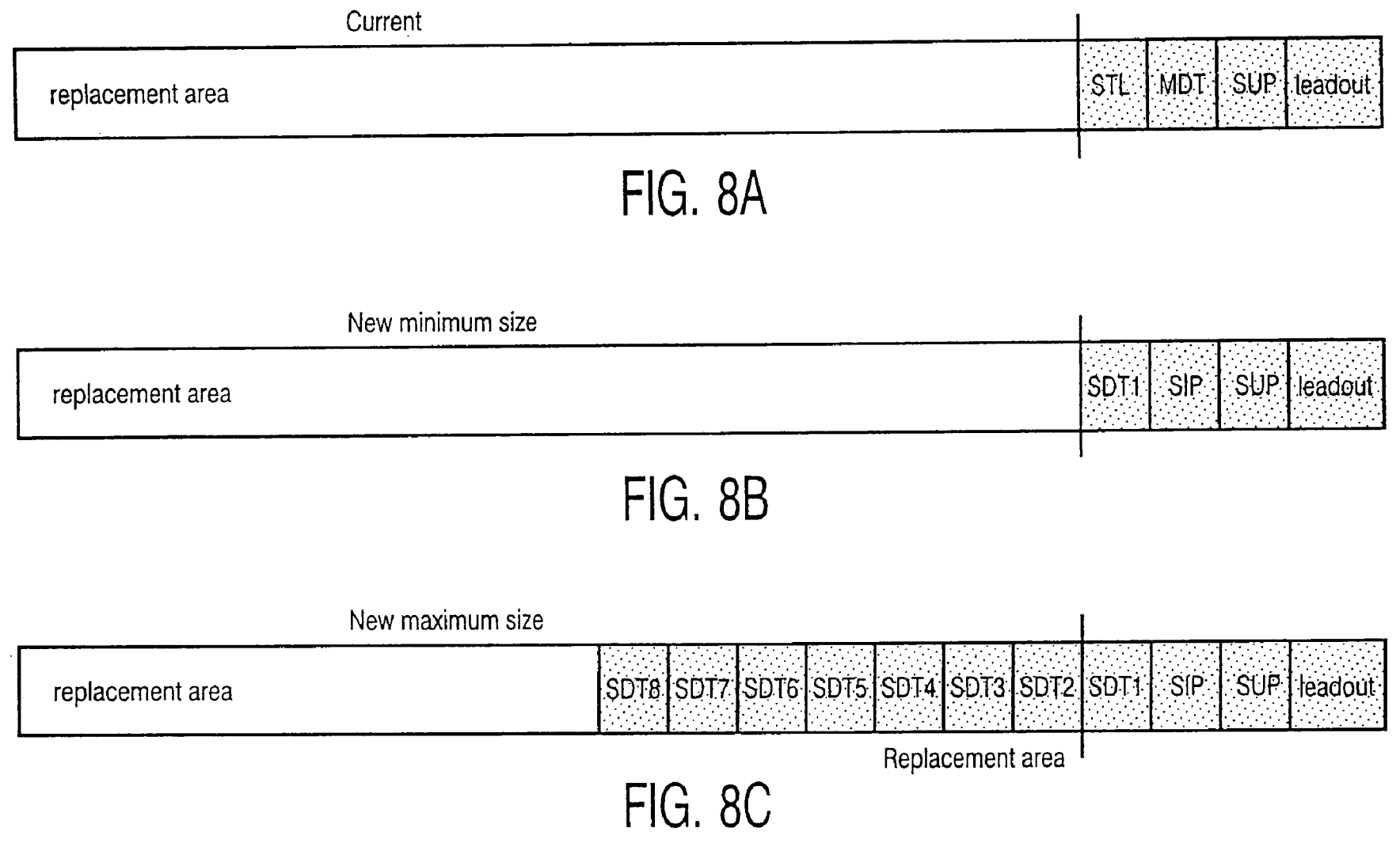

A duplicate is located as the Secondary Info Packet (SIP) on the outside of the disc, see FIGS. 8A–8C. Write or read problems for MIP or SIP means end of write capability. Discs with problems in the housekeeping should not be written on. However, the MIP and SIP are sparsely written as they only contain static information.

FIG. 7 shows the content of the Main Info Packet (MIP)/Second Info Packet (SIP) per 2 kB sector.

Finally, FIGS. 8A–8C show the changes of the Secondary Defect Table (SDT) and Temporary Defect Table (TDT) as disclosed in the above-mentioned applications. The status thereof being illustrated in FIG. 8A, while the new embodiments being illustrated in FIGS. 8B and 8C, with a minimum size and maximum size, respectively.

It is noted that the Sentinel Packet (STL) is replaced by a Secondary Info Packet (SIP), which has a fixed position, directly before the SUP packet and cannot be moved or spared. The Secondary Defect Table (SDT) is still a copy of the Main Defect Table (MDT) but now SDT1 . . . SDT8 is possible.

Growing into the replacements results in marking the replacements as unusable. An update counter is still used to detect a mismatch between MSD and SDT. The SDT is changed in the same way as the SDT.

Thus, a drive may replace complete 64 kB packets in case of DOW or in case of track problems during read and write and 2 kB replacements in case of scratches and fingerprints.

A further aspect of a medium formatted as disclosed above is the cross-platform disk compatibility with CD-ROM and DVD-ROM systems and legacy CD-RW drives already in the market. Preferably, the read-capability of legacy systems should be maximal.

However, legacy read-capable systems might lack defect-remapping ability or a PC-system might not have the suitable file-system to read back the data as organized on disk. Therefore, to achieve read back compatibility, a measure is proposed to make sure that a remapping-drive will be installed on legacy PC-systems prior to reading the data content of the disk, thereby avoiding data corruption due to incorrect physical address of the data. Further a measure is proposed that suitable files systems, if available, on the PC be used. And if no suitable file system is available on the system, the user is guided, by a message, how to obtain and successfully install a suitable read-solution. Another measure is proposed to ensure that the RW format will allow to make bootable disks which need to be readable on all CD-read capable PC-systems, and allow the current mechanism of CD-booting, such as specified in the Bootable CD-ROM Format Specification, Version 1.0, Jan. 25, 1995 from Phoenix Technologies and IBM, shortly referred to as "El-Torito".

Legacy write capable systems might have an application package and file system, required to perform legacy drag and drop on CD-RW. However, these systems typically lack capability to apply defect remapping or to update data in the Lead-In or Lead-Out. Measures are proposed to prevent that legacy systems will write to this media-format, thus in this case limit their capability to read-only solutions and thus avoiding incidental data corruption.

Figure 9A:
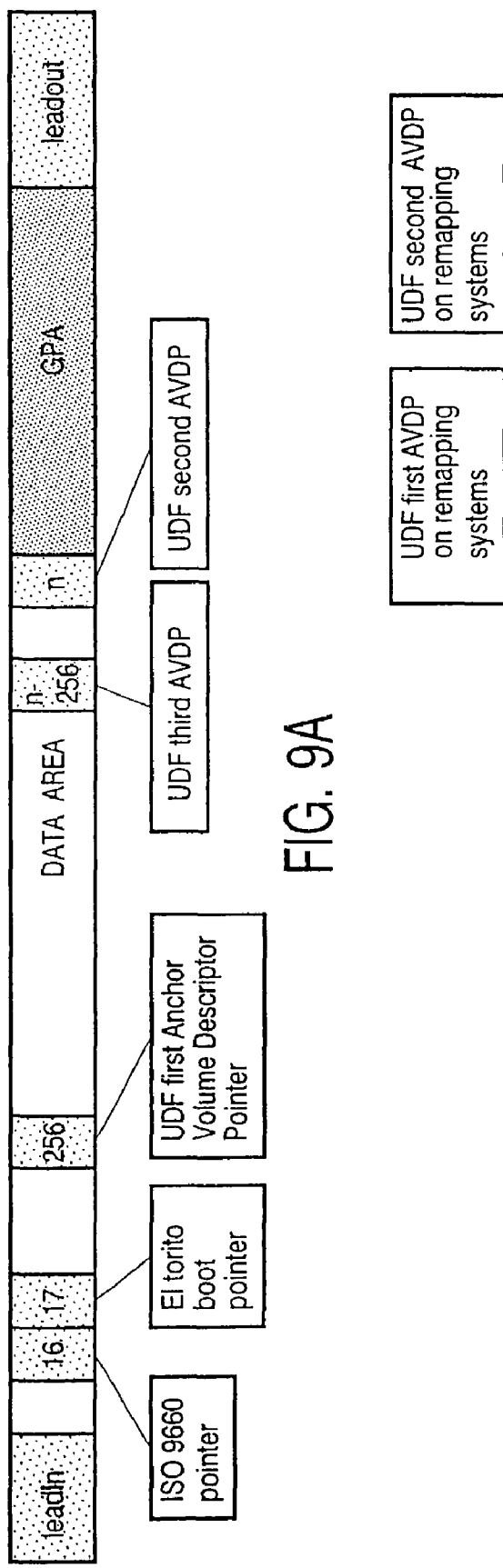
FIGS. 9A–9B show important boot sectors on the disc and their remapped locations in the spare area.
Figure 9B:
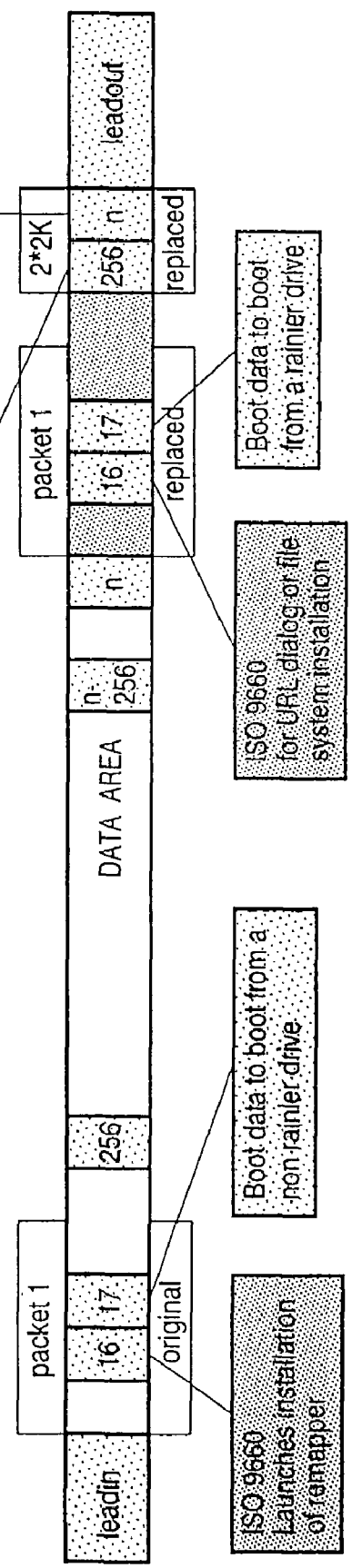

The method according to the invention, will be explained with reference to FIGS. 9A–9B. The method makes active use of a number of key features, enables, by using defect management in combination with key sectors for ISO 9660, data file systems and boot records. Some data-sectors play a gating role for enabling booting and file system read and write. FIGS. 9A–9B describe the case of CD-RW and UDF 1.02. However, other embodiments may be obtained with other file systems, such as, for example, FAT and other media, such as, for example, DVBD+RW and DVD-RW.

The key sectors are logical sector 17 for El-Toritoa booting, logical sector 16 for IS09660 booting, logical sector 256 (ADVP), n or n−256 (2nd ADVP) for UDF 1.02, with n being the last sector of the data zone.

The measure is to spare sector 16, 17, 256 and n (or n−256) by a dedicated fill in of these sectors and write a replacement sector as follows:

Sector number 16, being ISO structured, is used to upload a remap driver on the disk. This sector will be used by systems without a remapper. The sparing location of sector number 16, also being ISO structured, is used to store links to give a message or to a URL to download or install a file system. This replaced sector will be used by systems without UDF.

Sector number 17, being a boot sector, is used to store links to a boot-image, This sector is used by systems without a remapper. The sparing location of sector number 17, is also a boot sector and contains links to the same boot-image. This sector is used by systems with a remapper.

Sector number 256, n or (n−256) does not have any significant content. The sparing locations thereof however contain an UDF-ADVP and is being used by systems with UDF.

FIG. 9A shows the location of the above-mentioned sectors on a disc formatted according the format specified in the previous-mentioned applications. FIG. 9B shows the remapping of these locations to spare area according to an embodiment of the invention. Packet 1 is spared from too many overwrites by file system used of other sectors. This is done by replacing the complete packet as mentioned before. However, the sector retains boot and ISO 9660 capabilities. Sectors 256, n−256 and n contains non UDF data, which prevents UDF to start and ISO 9660 to load the remapper driver. The General Purpose Area (GPA) contains the remapped sectors.

The effect of the above structure applied to CD-RW media, when inserted into a drive with remapping capability or a legacy drive with remapping device-driver is (case 1):

a) enabling UDF reading when this file system is available on the PC; and b) showing the content of the ISO structure when no UDF reader is installed on the system. In this case, the ISO-structure 2 can be used to show a message to the end user (no UDF available, where/how to get one, eventually even a URL for downloading a suitable UDF reader-driver from the internet)

When the same disc is inserted into a drive without remapping capability, for a system without remapping-driver, this will result in (case 2):

a) launching the remapper-driver on the disk, as a result of loading the media by the PC-system via the ISO-link applied in ISO-structure-1 (links into a remapper driver on disk, eventually accompanied by a user-message); and b) after a boot, the PC will have full remapping capability, and resultantly from then act same as a solution according to "case 1".

The effect during powering on of the PC-system is (case 3):

Due to the fact that original location and spared location are assured to keep the same content (see definition above), independent of the presence of a remapping capabilities of the PC-system (drive or driver), the PC-system will always obtain the correct boot-information (ref EL-TORITO mechanism).

It is chosen to spare sector 17 at the formatting time of the media, in order to prevent that the packet containing sector-17 can be worn out by DOW from other use prior to adding the boot-information. This way, sector 17 can be saved for later use, until the original sector-17 will be filled in as boot sector. This way original location sector-17 can safeguarded to allow legacy-system boot-compatibility Obviously, after execution of the boot, the drive will return as "case 1" or "case 2".

Legacy drives/systems, although in some cases equipped with the suitable UDF file-system, should be prevented from writing to this medium (case 4):

Legacy drives do not have all capabilities required to cope correctly with the updating the defect-management-structures on the disk of the new CD-RW format (no sparing capability+nor ability to update MDT in the Lead-in).

As a result, it is wise to restricted these systems to read-only from this type of media (otherwise this could lead to incidental data-loss or data-corruption). This can be achieved easily by making sure the read-remapper-driver (installed between drive and host) will not allow write commands to the drive. This way the drive will automatically be limited to read-only behavior.

Finally it is remarked that although the invention has been described with reference to preferred embodiments thereof, it is to be understood that these are not limitative examples. Thus, various modifications thereof may become apparent to those skilled in the art, without departing from the scope of the invention, as defined by the claims. For instance a CD-RW may be replaced with a DVD-RW or the like. The method may be implemented in firmware in a drive or in an application controlling the drive.

The applicability of the same proposal to other file systems, for example UDF 1.02 +CD-RW and UDF with DVD+RW is obvious.

The invention may be implemented by means of both hardware and software, and that several "means" may be represented by the same item of hardware. Further, the invention lies in each and every novel feature or combination of features. It is also remarked that the word "comprising" does not exclude the presence of other elements or steps than those listed in a claim. Any reference signs do not limit the scope of the claims.

The invention claimed is:

1. A method of providing control information on defect management on a removable disc like recording medium, such as an optical disc, the disc comprising predefined locations for enabling disc booting and/or file system read/write, the method employing at least one of said locations for providing said control information.

2. A method of providing control information on defect management on a removable disc like recording medium, such as an optical disc, the disc comprising predefined locations for enabling disc booting and/or file system read/write, the method employing at least one of said locations for providing said control information, wherein the recording medium is addressable by logical sector numbering, the method employing logical sector numbered 16 reserved by the ISSO 9660 system to provide said control information.

3. The method as claimed in claim 2, wherein the method further comprises the steps of:
   recording pointer information in logical sector number 16; and
   recording, at the pointed location, a file system comprising said defect management.

4. The method as claimed in claim 2, wherein said method further comprises the steps of:
   recording pointer information in logical sector number 16; and
   recording, at the pointed location, a message or a link to download a file system comprising defect management.

5. The method as claimed in claim 2, wherein said method further comprises the step of:
   Recording, in logical sector numbered 17 reserved for disc booting, pointer information to a boot-image.

6. The method as claimed in claim 2, wherein said method further comprises the step of:
   Recording, in logical sectors numbered 256, n or (n−256), n being the largest number of the user area, reserved for UDF file system, non-UDF data.

* * * * *